(12) United States Patent
Tomlinson et al.

(10) Patent No.: US 6,543,199 B1
(45) Date of Patent: Apr. 8, 2003

(54) ROOF SHEETING

(75) Inventors: Richard W. Tomlinson, Watertown, CT (US); Thomas L. Jablonowski, Naugatuck, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 0 days.

(21) Appl. No.: 09/647,287

(22) PCT Filed: Apr. 29, 1999

(86) PCT No.: PCT/US99/09357

§ 371 (c)(1),
(2), (4) Date: Nov. 10, 2000

(87) PCT Pub. No.: WO99/55750

PCT Pub. Date: Nov. 4, 1999

Related U.S. Application Data

(60) Provisional application No. 60/083,691, filed on Apr. 30, 1998.

(51) Int. Cl.⁷ ................................. E04D 11/02
(52) U.S. Cl. .............. 52/746.11; 52/746.1; 52/408; 52/411; 156/308.2; 156/351; 156/353; 156/512; 156/517; 428/215; 428/516; 428/517; 428/519; 428/521; 428/522
(58) Field of Search ............ 52/746.11, 746.1 B, 52/408, 411; 156/71, 157, 306.6, 308.4, 308.2; 428/57, 58, 141, 147, 255, 295, 517, 519, 520, 521, 97, 522

(56) References Cited

U.S. PATENT DOCUMENTS

| | | | | |
|---|---|---|---|---|
| 3,975,335 A | | 8/1976 | Tiessens et al. | |
| 4,000,140 A | | 12/1976 | Tierney | |
| 4,129,542 A | | 12/1978 | Matheson et al. | |
| 4,337,112 A | | 6/1982 | Hollis | |
| 4,424,253 A | | 1/1984 | Anderson | |
| 4,424,304 A | | 1/1984 | Hambrecht et al. | |
| 4,445,306 A | | 5/1984 | Schauffele | |
| 4,461,875 A | | 7/1984 | Crepeau | |
| 4,722,961 A | | 2/1988 | Topcik | |
| 4,732,925 A | | 3/1988 | Davis | |
| 4,803,020 A | | 2/1989 | Vlaitis et al. | |
| 4,866,101 A | | 9/1989 | Iwasa et al. | |
| 5,096,743 A | | 3/1992 | Schoenbeck | |
| 5,256,228 A | * | 10/1993 | Davis et al. | 156/157 |
| 5,260,111 A | * | 11/1993 | Valaitis et al. | 428/57 |
| 5,370,755 A | * | 12/1994 | Davis et al. | 156/71 |
| 5,486,249 A | * | 1/1996 | Valaitis et al. | 156/71 |
| 5,504,136 A | | 4/1996 | Davis et al. | |
| 5,594,073 A | | 1/1997 | Crepeau et al. | |
| 5,663,228 A | | 9/1997 | Sasaki et al. | |
| 5,733,621 A | | 3/1998 | Cotsakis et al. | |

FOREIGN PATENT DOCUMENTS

| | | |
|---|---|---|
| EP | 68172 | 9/1986 |
| EP | 332404 | 1/1992 |
| JP | 49098450 | 9/1974 |
| JP | 55113546 | 9/1980 |
| JP | 61051038 | 3/1986 |
| JP | 86015892 | 4/1986 |
| JP | 61278540 | 12/1986 |
| JP | 62148505 | 7/1987 |
| JP | 63035634 | 2/1988 |
| JP | 92043935 | 7/1992 |
| JP | 06049283 | 2/1994 |
| JP | 07138429 | 5/1995 |
| JP | 72008143 | 8/1995 |

* cited by examiner

Primary Examiner—Yvonne M. Horton

(57) ABSTRACT

A method is disclosed for covering a roof with seamable sheet material for roofing prepared from a polymeric composition of matter comprising the steps of:
  applying layers of sheet material prepared from a seamable polymeric composition of matter to the roof being covered, overlapping adjacent edges of said layers, and
  adhering the overlapped areas to provide an acceptable seam strength; wherein the composition of matter comprises an interpolymer of ethylene, propylene, and at least two nonconjugated dienes, each having one reactive double bond.

16 Claims, No Drawings

ROOF SHEETING

The benefit of copending U.S. Provisional Application No. 60/083,691, filed Apr. 30, 1998 is hereby claimed.

BACKGROUND OF THE INVENTION

1. Field of the Invention

This invention is directed to a method for covering a roof. More specifically, this invention is directed to a method for covering a roof using a sheeting material comprising a copolymer of ethylene, propylene, and at least two nonconjugated dienes.

2. Description of Related Art

Industrial roofs in the past were traditionally treated with bitumen compositions to provide weather proofing. This practice in recent years has been replaced to a significant degree by applying rubber sheet materials to industrial roofs. In one common form of roofing system, a single-ply waterproof membrane or sheet, composed of ethylene propylene diene rubber (EPDM), is placed on top of a flat roof structure. The single-ply roof membrane is supplied in rolls having widths varying from ten to forty feet. In use, the membrane is unrolled on the roof and positioned in place. Appropriate splices are made at the edges of adjacent sheets, and suitable flashing is provided at curbs, skylights, vent pipes, and the like, all in a manner well known in the art.

To secure the membrane to the roof structure, three fundamentally different approaches have been taken. In one approach, known as the "adhered" roofing system, adhesive is applied to the entire roof and used to fasten the lower surface of the membrane and the upper surface of the roof structure. In a second approach, known as the "ballasted" system, the membrane is placed on the roof structure without adhesive there between, that is "loosely laid," and the membrane is held in position by a layer of smooth stone placed on top of it. In a third approach, known as a "mechanically attached" roofing system, elongated metal or plastic nailing strips having adhesive applied to the bottoms thereof are placed on top of the membrane at periodic spaced intervals, much like a grid, and secured in place by driving fasteners through the nailing strip and membrane into the underlying roof structure.

Originally, the roofing material was available only in rolls of relatively narrow width, for example, four feet wide. For a roof of large dimensions, the time required to apply the roofing material strips of narrow width was found to be excessive and, owing to high labor costs, intolerable from a commercial standpoint. Accordingly, to reduce the application time, and hence the cost, of roofing with synthetic rubber sheet stock, it was found desirable to provide sheet stock in rolls of very large width, such as forty feet wide. With sheet stock of such width, the time required to roof a building in this manner was a mere fraction of that necessary with sheet stock of narrow width. A method and apparatus for providing indefinite length stock of very large width from indefinite length stock of relatively narrow width are described in U.S. Pat. No. 4,337,112.

The use of elastomeric ethylene-propylene-nonconjugated diene terpolymer and isobutylene-conjugated diene copolymer compositions as the material in the construction of roof sheeting is well known in the art. Such sheeting in the cured, or cross-linked, state provides excellent roofing material in those applications where flat material is acceptable for disposition on equally flat or moderately contoured structures. Additionally, it is possible, as disclosed in U.S. Pat. No. 4,461,875, to modify such materials in order to render them suitable as flashing, for use on those portions of a roof characterized by irregular shape.

Owing to outstanding weathering resistance and flexibility, cured EPDM based roof sheeting has been rapidly gaining acceptance. This material is normally prepared by vulcanizing the composition in the presence of sulfur or sulfur-containing to compounds such as mercaptans. U.S. Pat. No. 4,803,020 also discloses the use of radiation cross-linking promoters in an EPDM sheeting composition that can be cured by ionizing radiation. A disadvantage of utilizing these elastomers is the lack of adhesion of EPDM, especially cured EPDM, to itself. In applying EPDM sheets to a roof, it is usually necessary to splice the cured EPDM sheets together. The splice or seam area is subjected to both short-term and long-term stresses such as those caused by roof movement, heavy winds, freeze-thaw cycling, and thermal cycling. Such stresses may manifest themselves in shear forces or peel forces (i.e., the seam peels back under severe stress conditions or results in a partially open seam under less severe conditions).

In view of the foregoing problem, adhesives have been used to bond the cured EPDM sheets together. Alternatively, special EPDM formulations have been devised that permit heating the overlapped edges and seaming them using heat and pressure in the absence of an adhesive.

A variety of methods for adhering or seaming the roofing membranes together has developed over the years. For example, solvent-based adhesives, which typically employ neoprene or butyl-based compounds, have been used to bond roof sheeting materials together by applying with a brush or other similar means the liquid or pastelike adhesives directly to the edge areas of the roofing membranes to be joined.

Alternatively, polymeric tapes have been developed, as adhesive compositions that are unvulcanized but which contain curatives so as to be vulcanizable or vulcanized. These are typically used in the form of a preformed tape to bond sheet membranes together.

U.S. Pat. No. 4,000,140 discloses a waterproof sheet material suitable for use as a waterproof roofing layer, the sheet being composed of a mixture comprising (a) a bituminous material, (b) a synthetic polymeric material, and (c) particulate filler, said synthetic material comprising at least one uncured copolymer selected from ethylene-propylene copolymers and ethylene-propylene-diene copolymers and at least one synthetic polar elastomer.

U.S. Pat. No. 4,129,542 discloses a thermoplastic, elastomeric material that is obtained by curing under shear conditions (e.g., in a high shear internal mixer) a blend of vulcanizable rubber (e.g., SBR, EPDM) and a bituminous material in the presence of a rubber vulcanizing agent (e.g., sulfur or peroxide).

U.S. Pat. No. 4,337,112 discloses an apparatus and method for making a composite sheet of indefinite length and very large predetermined width from indefinite length sheet stock of relatively small width.

U.S. Pat. No. 4,424,253 discloses blends of chlorinated hydrocarbon rubber selected from chlorosulfonated polyethylene having about 22 to 28 weight percent Cl and 0.4–1.2 weight percent sulfur and chlorinated polyethylene having about 22 to 28 weight percent Cl with EPM or EPDM elastomers (which may be terpolymers or tetra polymers) in a proportion of 75 to 93 percent of the former and 6 to 25 percent of the latter that can be compounded with usual fillers, pigments, stabilizers, and processing aids and formed into sheets that form hot bonded laminate structures with linear ethylene polymer sheets.

U.S. Pat. No. 4,445,306 discloses a system for mechanically attaching a flexible waterproof membrane to an underlying structure including an elongated fastening bar that is placed above the membrane and fastened to the roof structure with fasteners that are driven through the bar from the tops thereof through the underlying membrane and into the roof structure, and an elongated waterproof strip having (a) a central region sandwiched beneath the bottom of the bar and the membrane, and through which the fasteners also pass, and (b) marginal regions that wrap upward around the bar and overlap each other above the bar and the heads of the fasteners, providing a waterproof seal for the bar with a double thickness layer of strip material above the fastener heads.

U.S. Pat. No. 4,461,875 discloses a composition for application as roof sheeting or flashing comprising 100 parts of an elastomer selected from the group consisting of EPDM, butyl rubber, and an EPDM-butyl rubber mixture; 0.1 to 3.0 parts of a compound having the structural formula $\{(CH_2)_n NCS\}_2 S_6$, where n is 4 or 5; and 0 to 5.0 parts of a sulfur donor curative.

U.S. Pat. No. 4,722,961 discloses a roofing membrane composition comprising:
  (a) a first hydrolyzable polyolefin having a density less than or equal to 0.92 selected from the group consisting of
    (i) a copolymer of ethylene or propylene and silane and
    (ii) a silane modified polyethylene, polypropylene, or ethylene/propylene copolymer
  wherein, in (i) or (ii), the silane is present in an amount of about 0.5 to about 10 percent by weight based on the weight of the first polyolefin, said first polyolefin being present in the composition in an amount of about 20 to about 90 percent by weight based on the weight of the composition;
  (b) a second polyolefin selected from the group consisting of
    (i) an ethylene-propylene-diene terpolymer rubber;
    (ii) a copolymer of ethylene and vinyl acetate; and
    (iii) a copolymer of ethylene and ethyl acrylate;
  said second polyolefin being present in the composition in an amount of about 10 to about 80 percent by weight based on the combined weight of the first and second polyolefins;
  (c) a particulate filler selected from the group consisting of carbon black and nonblack reinforcing fillers and mixtures thereof; and
  (d) an oil compound suitable for roofing membranes selected from the group consisting of paraffin oils, naphthenic oils, and liquid polybutene.

U.S. Pat. No. 4,732,925 discloses vulcanizable elastomeric roof sheeting or flashing compositions comprising a vulcanizable elastomer, a metallurgical carbon and a vulcanizing agent. The compositions may additionally contain conventional thermal or furnace-type carbon blacks and other conventional rubber chemical additives.

U.S. Pat. No. 5,096,743 discloses a process for curing a heat-weldable roofing membrane by applying elemental sulfur on the exterior surface of the roofing membrane, said membrane being a blend of
  (a) 50 to 80 percent by weight of an ethylene/propylene/ nonconjugated diene elastomer and
  (b) 20 to 50 percent by weight of an ethylene-containing polymer selected from the group consisting of polyethylene a-monoolefin copolymer wherein the monoolefin contains from 3 to 12 carbon atoms and is present in amounts of 2 to 8 percent by weight, and an ethylene/ vinyl acetate copolymer having a vinyl acetate content up to about 10 percent by weight, said membrane containing a cure accelerator. The roofing membrane is exposed to ambient outdoor temperatures resulting in migration of sulfur to the interior of the membrane where, together with the cure accelerator, it effects cure of the membrane.

U.S. Pat. No. 5,256,228 discloses a heat seamable sheet material for roofing prepared from an uncured polymeric composition of matter that comprises 100 parts by weight of a polymer blend comprising about 50 to 90 parts by weight of polyolefins having a crystallinity of up to about 2 percent by weight. The polyolefins are prepared from monomers having at least two carbon atoms and mixtures thereof. The polymer blend also comprises about 10 to 50 parts by weight of a highly crystalline thermoplasticity promoter selected from the group consisting of polymeric olefins prepared from monomers consisting of at least two carbon atoms; about 50 to 250 parts by weight of a filler selected from the group consisting of reinforcing and nonreinforcing materials and mixtures thereof per 100 parts of the polymer blend; and about 20 to 150 parts by weight of a processing material and mixtures thereof per 100 parts of the polymer blend. A method for covering a roof comprises the steps of applying layers of sheet material as described above to the roof being covered; overlapping adjacent edges of the layers; heating the overlapped areas to slightly above the softening point of the sheet material and seaming the overlapped areas using heat and sufficient pressure to provide an acceptable seam, the composition of matter having sufficient self-adhesion without the use of an adhesive.

U.S. Pat. No. 5,504,136 discloses an adhesive tape composition that includes a polymer blend comprising at least one EPDM rubber, and preferably three EPDM rubbers in substantially equal amounts, and an adhesive-enhancing polymer selected from the group consisting of polyisoprene, polybutadiene, and ethylene-propylene copolymer and mixtures thereof. The tape adhesive composition further includes at least one tackifying additive compatible with said polymer blend and a sulfur and organic accelerator cure package for said polymer blend, the adhesive composition being devoid of butyl rubber which is found in most other adhesive tape compositions. A method is also provided for covering roofs that includes the step of employing the adhesive tape composition.

U.S. Pat. No. 5,594,073 discloses ambient temperature-curable roofing compositions and ambient temperature-curable sheeting compositions, both of which include an elastomer or elastomer mixture such as ethylene-propylene nonconjugated diene terpolymer, butyl rubber, and mixtures thereof. Such elastomers are cured with conventional dialkylthiourea and sulfur type curatives. Also used are conventional thiuram and dithiocarbamate type accelerators.

U.S. Pat. No. 5,733,621 discloses an adhesive roofing tape based on a combination of brominated butyl rubber and EPDM. A nondiene block terpolymer is interspersed in the cross-linked polymer network. A plasticizer and tackifier are included to provide resiliency and permanent tack. An important aspect of the invention is to use a high molecular weight polyisobutylene plasticizer and a peroxide curing system. Rapid cross-linking without concomitant rapid degradation of the brominated butyl rubber occurs, and some limited degradation of the plasticizer contributes to surface tack.

SUMMARY OF THE INVENTION

The rubberized polymer compositions from which sheet materials used in the production of roofing membranes vary greatly, but they must have characteristics that permit processing at high speeds through two-roll mills or calenders into thicknesses in the range of about 20 to about 60 thousands of an inch. One characteristic of the polymer compositions that significantly affects the milling operation of these sheet materials is known as "tack." If the tack is too great or too little, the composition does not process through the equipment. Typically, the composition does not separate from the rolls of the mill and form a sheet of uniform thickness. Minor variations in the tack property of a polymer composition can provide significant variations in the efficiency of the process for making roof sheeting and preventing waste of material during processing.

During the manufacture of sheeting membranes, it is necessary to assemble many individual pieces in order to provide larger sheets. This procedure is accomplished by overlapping an edge of one sheet onto another sheet to create a bond between the sheets. This process is repeated until the desired length is achieved. The areas that are overlapped must possess sufficient uncured tack so that the overlapped joint holds together and does not delaminate when the assembled sheeting membrane continues through the other stages of manufacture.

In some roof sheeting manufacturing processes, the stored, uncured sheeting stock enters the process by being broken down or masticated on a mill before being fed as strips into other processing equipment. The room temperature stock, when placed on the mill, has to break down and band or stick onto the mill surface without any external help so that strips can be cut from the banded stock and fed to other downstream processing equipment. The polymer used within the compounded stock naturally controls this mill behavior. Failure of the stock to break down and band on the roll can cause it to fall through the mill rolls and onto the floor and result in an interruption in the production cycle.

Ethylene-propylene-ethylidene norbornene terpolymers perform well in is sheeting applications but are deficient in tack and mill processability because their tangent delta is too high. It is possible to achieve excellent tack properties and mill processability via incorporation of DCPD or other diene referenced herein, because the DCPD increases branching and thus reduces tangent delta.

One object of the present invention is to provide a method for covering a roof that includes the use of an EPDM type polymer that has good uncured tack properties and characteristics that facilitate processing during the sheet manufacturing process.

The present invention is directed to a method for covering a roof that includes using a composition comprising a thermosetting rubber composition. The rubber composition comprises a tetrapolymer of ethylene, propylene, and at least two nonconjugated dienes.

More particularly, the present invention is directed to a method for covering a roof with seamable sheet material for roofing prepared from a polymeric composition of matter comprising the steps of:
  applying layers of sheet material prepared from a seamable polymeric composition of matter to the roof being covered;
  overlapping adjacent edges of said layers; and
  adhering the overlapped areas to provide an acceptable seam strength;
wherein said composition of matter comprises an interpolymer of ethylene, propylene, and at least two nonconjugated dienes, each having one reactive double bond.

DESCRIPTION OF THE PREFERRED EMBODIMENTS

The EPDM elastomers employed in the practice of the present invention perform well in sheeting applications and include desirable tack properties and mill processability. Such sheeting in the cured, or cross-linked, state provides excellent roofing material where flat material is acceptable for disposition on equally flat or moderately contoured structures. Cross-linked EPDM rubber sheeting has an excellent reputation as an effective barrier to roof leaks on the surfaces on which it is applied. The utilization of EPDM roof sheeting provides a very effective long-term protector against water leakage.

EPDM is used as the elastomer in the preferred embodiment of the present invention. The EPDM used is an interpolymer prepared by the polymerization of at least four monomers, which include ethylene and one or more olefin monomer(s) having the general formula $H_2C=CHR$, wherein R is an alkyl group having from one to seven carbon atoms. In a preferred embodiment, one such olefin monomer is propylene. The EPDM also includes at least two nonconjugated dienes, each having one reactive double bond available for crosslinking, which can be a $C_6$–$C_{12}$ linear or $C_9$–$C_{10}$ bridged ring hydrocarbon diene copolymerizable with the aforementioned monomers. The dienes are preferably selected from the group consisting of 1,4-hexadiene, 2-methyl-1,5-hexadiene, 1,9-octadecadiene, dicyclopentadiene, tricyclopentadiene, 5-vinyl-2-norbornene, 5-ethylidene-2-norbornene, and 5-methylene-2-norbornene.

In addition to the two or more nonconjugated dienes, each having one reactive double bond available for crosslinking, there may also be, if desired, one or more additional dienes having two reactive double bonds such as, but not limited to, 1,4-pentadiene, 1,5-hexadiene, 1,7-octadiene, 3,6-dimethyl-1,7-octadiene, 4,5-dimethyl-1,7-octadiene, 1,9-decadiene, 1,11-dodecadiene, 1,20-heneicosadiene, 5-(5-hexenyl)-2-norbornene, 2,5-norbornadiene, 5-(2-propenyl)-2-norbornene, and the so-called "norborneonorbornene" obtained by reaction of cyclopentadiene with norbornadiene-2,5.

The elastomers contain about 50 to 75 weight percent of ethylene and about 1 to 15 weight percent of the dienes, the balance being propylene. The preferred embodiment of the elastomer employed in the practice of the present invention is an ethylene, propylene, ethylidene norbornene, and dicyclopentadiene tetrapolymer having excellent uncured tack properties and improved mill processability. Desirable concentrations of ethylidene norbornene (ENB) are 1 to 10 weight percent and, preferably, 2 to 4 weight percent. Desirable concentrations of dicyclopentadiene (DCPD) are 0.1 to 5 weight percent. A more desirable concentration of DCPD is 0.3 to 2 and, preferably, 0.4 to 1 weight percent. Desirable ratios of ENB to DCPD are 2:1 to 20:1. The preferred ratio of ENB to DCPD is 5:1. The dicyclopentadiene provides these properties by lowering the tangent delta value of the polymer composition as compared with a terpolymer of ethylene, propylene, and ethylidene norbornene. These properties are important in the manufacture of roof sheeting products.

The improved tack properties are provided by the addition of dicyclopentadiene along with the customary amount of ethylidene norbornene usually found in terpolymers of ethylene, propylene and ethylidene norbornene, which makes the polymer structure more branched, as manifested by a reduced tangent delta value, The EPDM interpolymer composition employed in the practice of the present invention preferably has a Mooney viscosity (ML1+4 @ 125° C.) of about 35 to about 90 or, desirably, about 40 to about 70. A preferred high molecular weight EPDM interpolymer can be prepared by polymerizing ethylene, propylene, and at least two nonconjugated dienes in the presence of a Ziegler-Natta catalyst in a suitable solvent while, if necessary, supplying hydrogen as a molecular weight modifier. The polymerization is performed in solution.

A Ziegler-Natta catalyst consists of at least one transition metal compound such as, for example, a solvent-soluble or partially soluble vanadium compound, and at least one organometallic compound such as, for example, an organoaluminum compound.

The vanadium compounds are, preferably, $VOCl_3$, $VCl_4$ or the reaction products of $VOCl_3$ or $VCl_4$ with at least one alcohol. In this case, the alcohol includes, for example, a member selected from the group consisting of methanol, ethanol, propanol, butanol, pentanol, hexanol, heptanol, octanol, decanol, undecanol, dodecanol, and the like, and isomers thereof. Alcohols having three to eight carbon atoms are preferred.

The organoaluminum compound can be selected from the group consisting of, for example, triethylaluminum, triisobutylaluminum, tri-n-hexyl-aluminum, diethylaluminum monochloride, diisobutylaluminum monochloride, ethylaluminum sesquichloride, butylaluminum sesquichloride, ethylaluminum dichloride, butylaluminum dichloride, methylaluminoxane, which is the reaction product of trimethylaluminum with water, and the like. These organoaluminum compounds can be used singly or in admixture of two or more.

The solvent employed in the polymerization reaction is usually a hydrocarbon solvent. Desirable hydrocarbon solvents include n-pentane, n-hexane, n-heptane, n-octane, isooctane, cyclohexane, and the like. These hydrocarbon solvents can be used singly or in admixture of two or more.

It is within the scope of the present invention to blend the above-described EPDM polymer with one or more additional compatible elastomers for special needs. Exemplary elastomers are chlorosulfonated polyethylene, chlorinated polyethylene, a copolymer of ethylene or propylene and silane, a silane modified polyethylene, polypropylene, or ethylene/propylene copolymer, polyethylene, polypropylene, ethylene/vinyl acetate copolymer, poly isoprene, and polybutadiene. Where such an additional elastomer is used, it is preferred that it be butyl rubber, i.e., a copolymer of isobutylene and isoprene, as well as other rubbery copolymers comprising at least 50 percent by weight of an isoolefin having four to eight carbon atoms and 50 percent or less by weight of an open chain conjugated diolefin having four to eight carbon atoms. "Butyl rubber" is intended also to include halogenated butyl rubber such as chlorobutyl or bromobutyl rubber as well as those types of butyl rubber in which conjugated diene functionality has been added in the linear backbone at the diolefin units.

A roofing composition for use in the practice of the present invention is provided by including an effective quantity of a curing agent with the EPDM interpolymer. The roofing composition can be manufactured in sheets of the desired dimensions. Such sheets are usually formed by calendering or extruding the polymer composition.

The EPDM interpolymer must be accompanied by an effective quantity of a curing agent or a "curative package." A curative package can include a peroxide compound or a sulfur donor curative and at least one cure accelerator, which provides cross-linking of the rubber chains when later subjected to curing temperatures.

The sulfur donor curative may be one or more of the following compounds: sulfur, dimethyl-diphenylthiuram disulfide, dipentamethylenethiuram tetrasulfide, tetraethylthiuram disulfide, tetramethylthiuram disulfide, alkyl disulfides, selenium diethyldithiocarbamate, selenium dimethyldithiocarbamate, 4,4'-dithiodimorpholine, and N,N'-dithiobis(hexahydro-2H-azepinon-2). It should be appreciated that this list is not exclusive and other sulfur donating compounds known in the art are within the contemplation of this invention. The preferred curing agent is sulfur, preferably at a level of about 0.1 to about 5.0 parts by weight per 100 parts by weight of the elastomer, more preferably 0.4 to 3.0 parts, most preferably 0.5 to 2.0 parts, and in commercially available elemental form such as the commonly used rhombic crystalline form called "rubber makers' sulfur" or "spider sulfur."

The optional cure accelerator is of one of the following classes:

1. Thiazoles, wherein representative materials are benzothiazyl disulfide and 2-mercaptobenzothiazole.
2. Thiuram monosulfides and thiuram disulfides. Among the thiuram mono- and disulfides are included lower-alkyl, monocyclic, aryl, and cyclic alkylene thiuram sulfides. Representative materials include:
   Tetramethylthiuram disulfide;
   Tetramethylthiuram monosulfide;
   Tetraethylthiuram disulfide;
   Tetrabutylthiuram monosulfide;
   Diisopropylthiuram disulfide; and
   Phenylethylthiuram disulfide.
3. A dithiocarbamate-type accelerator such as a salt of a dialkyldithiocarbamate wherein the alkyl groups can have one to six carbon atoms and wherein such a salt can be formed in conjunction with bismuth, cadmium, copper, iron, nickel, lead, potassium, selenium, sodium, tellurium or zinc. Specific examples are:
   Zinc dibutyldithiocarbamate;
   Zinc pentamethylenedithiocarbamate;
   Bismuth dimethyldithiocarbamate;
   Nickel dibutyldithiocarbamate;
   Copper dimethyldithiocarbamate;
   Selenium diethyldithiocarbamate;
   Lead dimethyldithiocarbamate;
   Selenium dimethyldithiocarbamate;
   Tellurium dimethyldithiocarbamate;
   Tellurium diethyldithiocarbamate;
   Cadmium diethyldithiocarbamate;
   Zinc dibenzyldithiocarbamate;
   Zinc dimethyldithiocarbamate; and
   Zinc diethyldithiocarbamate.

More than one of the curative agents or "cure accelerators" can be utilized to optimize the desired blend of cured properties and to optimize the processing characteristics. The use of more than one cure accelerator can be desirable for accommodating the solubility limitations of each individual type of accelerator in EPDM. Also, the tendency of certain materials to "bloom" to the surface of the rubber part can be minimized by maintaining each material at a level well below the solubility limit in the base rubber elastomer.

As indicated above, elastomeric roof sheeting or membrane is normally vulcanized prior to application to the roof surface. Thus, vulcanizing systems for EPDM elastomer compositions used as roofing membranes can be virtually any of those known in the art to be effective in the heat curing of EPDM compositions. Suitable vulcanizing systems can be readily determined without undue experimentation by appropriate selection from the vulcanizing agents and accelerators listed above.

As also mentioned above, elastomer roof flashing which is applied to the roof surface in an unvulcanized state contains a special cure package that allows it to cure in situ on the roof. Thus, EPDM compositions that are used as flashing materials for vulcanized EPDM roofing membranes contain a special vulcanizing system that allows the EPDM flashing to cure in situ on the roof under ambient temperature conditions over a period of time. In time, the EPDM flashing will develop physical properties that are comparable to those of the vulcanized EPDM roofing membrane.

It is also contemplated that the sheeting materials used in the practice of the present invention can have additional ingredients incorporated in their composition. Among the additives that can be present in the composition are processing oils, plasticizers, antioxidants, UV stabilizers, cure retarders, filler and reinforcing agents, and the like.

Filler and reinforcing agents, which can be especially useful in the composition, can be selected from the group consisting of carbon black, silicates, talc, mica, clay, calcium carbonate, and the like, and mixtures thereof. Where fillers are used in the roofing membrane composition, they are normally added because of their reinforcement capability, which can contribute a substantial increase in tensile strength. These fillers are introduced into the composition in particulate form. The particles have a size in the range of about 10 to about 500 millimicrons, and, preferably, in the range of about 25 to about 100 millimicrons. Carbon black is used where a black roofing membrane is desired. Non-black fillers such as precipitated silica, clay, and magnesium silicate can also be used, as well as mixtures of carbon black and nonblack fillers.

Other ingredients can be incorporated into the roofing compositions employed in the practice of the present invention, including activators such as zinc oxide, stearic acid, and zinc stearate; antidegradants; tackifiers; and processing aids. The curable elastomer will typically contain a metal oxide, such as zinc oxide, with a fatty acid, such as stearic acid. Alternatively, a metal stearate such as zinc stearate can be employed, which combines the activating effects of the metal oxide and fatty acid.

An oil type compound can also desirably be added to the roofing membrane composition. When reinforcing fillers such as carbon black are added to polymers, the viscosity of the mixture may become very high, thus reducing the capacity of the mixture to be worked into roofing membranes. Therefore, unless the viscosity can be reduced, the amount of filler that can be mixed into the polymer may be limited. The function of the oil type compounds is to reduce the viscosity of the mixture and also soften the polymer. As the oil type compounds are added to the composition, the amount of filler can be increased. Examples of oil type compounds are paraffin oils, naphthenic oils, and liquid polybutene. Liquid polybutene is considered to be more compatible with ethylene copolymers than paraffin oils. The oil type compound is typically used at a level of about 10 to about 100 parts where the filler level is in the range of about 50 to about 200 parts by weight.

The compounding of the composition of this invention can be accomplished by any suitable means including an internal mixer (for example, a type B Banbury mixer), a transfer mixer, an extruder, or an open mill. Independent of the method of compounding the composition, the resulting composition has a cure rate that correlates with the development of cross-linking. In the type B Banbury internal mixer, the dry or powdery materials are added rapidly followed by the addition of any liquids, e.g., process oils, plasticizers, etc., and, finally, the elastomer(s).

The roofing composition that comprises the composition is in the form of sheets of the desired dimensions, usually formed by calendering or extruding the sheet, then cutting the sheet to proper size and shape. The sheets may be cut for use as roof sheeting or flashing members.

A desirable process for manufacturing the roof sheeting of this material is as follows.

Ingredients, such as EPDM, filler, plasticizer, and curative/activators, are mixed to form a polymer composition. The polymer composition is then formed into slabs, which can be stored for hours or days. The slabs of polymer composition are warmed on a mill and then fed to a calender, extruder, or similar means to form sheets. The sheets of polymer composition can be partially overlapped and spliced. Then, the sheets are cured, preferably by subjecting them to heat and/or pressure. Heating is desirably performed by a steam autoclave. The continuous sheet can be dusted with talc or a similar release compound, or a release sheet can be laid over the continuous sheet, whereupon it can be rolled for further handling and shipping.

The desirable mill banding properties of the polymer composition facilitate handling in the mill and during feeding to a calender, extruder, or similar means. This desirable mill banding property imparts a significant commercial benefit in the manufacture of the polymer composition.

The roof covering employed in the practice of the present invention can cover any roofing base material, such as wood, composition board, concrete, brick, or metal. In many applications, insulating or vapor barrier layers may desirably be first placed over the roof bottom prior to the disposition of the composition.

The advantages and the important features of the present invention will be more apparent from the following examples, which are intended to illustrate the invention further and are not intended to limit the scope of the invention in any manner.

EXAMPLES

The following examples compare the properties of an EPDM terpolymer with the preferred embodiments of the EPDM tetrapolymer of the invention. The polymer compositions of the three examples include the following components and parts by weight: 100 EPDM, 150 filler, 80 plasticizer, 7.5 curative/activators. Table 1 compares the formulas of the three examples. Table 2 presents properties of the polymer compositions.

Tack Tests

Tack is the "stickiness" of the rubber compound and the ability of the compound to adhere to itself. It is an important property for roof sheeting compounds because to make factory sheets wider than the width of the rubber calender, the sheet needs to be spliced to itself in the uncured stage and the fabricated sheet then vulcanized to make a monolithic sheet. Good tack ensures that the uncured splices adhere adequately before curing without showing signs of separation, thus ensuring a good vulcanized factory seam. The Skewis Tack Test and the Tel-Tak Test are two laboratory tests used to predict good factory seam fabrication performance.

Skewis Tack Test

Sample Preparation

A compounded rubber stock is passed through a mill ten times at a temperature of 65° C. The mill is adjusted to provide a sheet approximately 0.080 inches in thickness. A 2 inches wide by 9 inches long section is dyed from the milled sheet. A piece of cloth is placed on one side of section and a Mylar film is placed on each side of the section. The assemble is placed in a 2 inch wide by 9 inches long by 0.075 inches thick mold and molded for 2 minutes at 202°

F. under 20,000 psi gauge pressure. Samples are cut with a ½ inch wide by 5 inch long medal die. This sample is cut in half to provide two samples of ½ inch wide by 2½ inches long. The Mylar film is not removed from the sample until it is ready to be put in the test instrument.

Test Procedure

The Skewis Tack Test and instrument was developed by Uniroyal Chemical Company. A detailed description of the test method can be found in Rubber Chemistry and Technology, Volume 38, Number 4, November 1965, pages 689–699. It allows a compounded rubber sample to be brought into contact under a fixed load of 1000 grams for a predetermined length of time (10 seconds). A fixed load of 500 grams is then applied to separate the samples and the time required for separation to occur is measured to the nearest length of a second. The sequence of operations is controlled automatically by external timers. The width of the sample is 0.50 inches and the samples are clamped at right angles to each other to provide a contact area of 0.25 square inches.

Calculation of Tack Number

The Tack Number is calculated according to the following equation:

$$Tack\ Number = \frac{F_b T_b^{1/3}}{F_c T_c^{1/3}}$$

Where $F_c$=Contact Force (1000 grams)

$T_c$=Contact Time (10 seconds)

$F_b$=Separation Force (500 grams)

$T_b$=Measured Separation Time (nearest 0.1 second)

Tel-Tak Test

Sample Preparation

The samples are prepared in the same way as those for the Skewis Tack Test, except that they are cut with a ¼ inches wide by 5 inches long die. These are cut in half to provide two samples each of 2 long by ¼ inches wide.

Test Procedure

The Tel-Tak Model TT-1 instrument is manufactured by Monsanto Instrument Company. This instrument presses together under a fixed load of 16 ounces for a predetermined time of 15 seconds. The peak force to pull the samples apart at a rate of 1 inch per minute is measured with a spring scale.

Mill Banding Test

The mill banding test evaluates the propensity of the rubber compound to adhere to the rubber mill rolls during processing. It is desirable for the compound to form a tight band on the rolls to facilitate handling of the rubber and, by a rubber strip cut from the mill rolls, feeding downstream equipment such as calenders and extruders. Poor mill banding indicates the stock handles poorly by bagging and folding on the mill rolls, and in the extreme case the rubber compound can fall to the mill pan beneath the rolls or transfer to the opposite roll of the mill. Poor mill banding can cause production problems that could result in excess air entrapment into the rubber compound and cause production inefficiencies due to excess manpower required to handle the rubber compound effectively.

The test is performed by taking the cooled rubber compound previously mixed in the internal mixer, and rolling it into a cylindrical shape approximately 3" diameter by 12" long. The rubber is fed into the nip of a rubber mill where the distance between the rolls is 0.100" and the front (slower) roll temperature is between 55° C. and 60° C., and the back (faster) roll temperature is between 65° C. and 70° C. As the rubber compound passes through the nip it is brought back into the nip while the last part of the rubber is still in the nip, forming a band of rubber on the front roll of the two roll mill. The stock is observed to evaluate the degree of tightness on the front roll, i.e. whether it bands snugly on the roll or has the tendency to bag or fold. The mill banding is rated as follows:

5 (excellent): the stock hugs the front roll tightly and gives a smooth banded sheet and rolling bank;

4 (very good): the stock has a slight tendency to fold;

3. (Good): the stock has a moderate tendency to fold 2. (fair): the stock shows more folding and some bagging to the bottom of the mill rolls;

1. (Poor): the stock shows extreme bagging and/or folding and the stock eventually transfers to the back (faster roll).

TABLE 1

|  | Example 1 | Example 2 | Example 3 |
| --- | --- | --- | --- |
| ML1 + 4 @ 125° C. | 61 | 58 | 64 |
| Ethylene/Propylene ratio | 70/30 | 70/30 | 67/33 |
| Ethylidenenorbornene (ENB), % | 2.4 | 2.5 | 2.1 |
| Dicyclopentadiene (DCPD), % | 0 | 0.5 | 0.8 |
| Tangent delta, 0.25 rps @ 150° C. | 1.4 | 1.0 | 0.9 |
| Molecular weight (Mw)[1] | 4.1 | 4.2 | 4.4 |
| Molecular weight distribution (Mw/Mn) | 2.3 | 2.3 | 2.3 |

[1]Mw and Mw/Mn are based on polystyrene standards.

TABLE 2

|  | Example 1 | Example 2 | Example 3 |
| --- | --- | --- | --- |
| Skewis tack number | 0.33 | 0.42 | 1.02 |
| Tel tac LB/in$^2$ | 7 | 9 | 11 |
| Mill banding[2] | 1 | 5 | — |

[2]5 = Excellent, 4 = Very good, 3 = Good, 2 = Fair, 1 = Poor.

The data in Table 2 illustrates the benefit of the more highly branched polymers in Examples 2 and 3, because of their incorporation of DCPD resulting in reduced tangent delta values, giving much improved tack and mill banding values. High values for tack and mill banding are important for good sheet splicing and processing characteristics, respectively.

In view of the many changes and modifications that can be made without departing from principles underlying the invention, reference should be made to the appended claims for an understanding of the scope of the protection to be afforded the invention.

What is claimed is:

1. A method for covering a roof with seamable sheet material for roofing prepared from a polymeric composition of matter comprising the steps of:

applying layers of sheet material prepared from a seamable polymeric composition of matter to the roof being covered;

overlapping adjacent edges of said layers; and adhering the overlapped areas to provide an acceptable seam strength;

wherein said composition of matter comprises an interpolymer comprising:

A) ethylene,

B) propylene,
C) a first nonconjugated diene having one reactive double bond, and
D) a second nonconjugated diene having one reactive double bond.

2. The method of claim 1 wherein the first and second nonconjugated dienes are selected from the group consisting of 1,4-hexadiene, 2-methyl-1,5-hexadiene, 1,9-octadecadiene, dicyclopentadiene, tricyclopentadiene, 5-vinyl-2-norbornene, 5-ethylidene-2-norbornene, and 5-methylene-2-norbornene.

3. The method of claim 2 wherein the first nonconjugated diene is 5-ethylidene-2-norbornene.

4. The method of claim 3 wherein the second nonconjugated diene is dicyclopentadiene.

5. The method of claim 1 wherein the interpolymer further comprises at least one diene having two reactive double bonds wherein said diene is different from said first nonconjugated diene and said second nonconjugated diene.

6. The method of claim 5 wherein the diene having two reactive double bonds is selected from the group consisting of 1,4-pentadiene, 1,5-hexadiene, 1,7-octadiene, 3,6-dimethyl-1,7-octadiene, 4,5-dimethyl-1,7-octadiene, 1,9-decadiene, 1,11-dodecadiene, 1,20-heneicosadiene, 5-(5-hexenyl)-2-norbornene, 2,5norbornadiene, 5-(2-propenyl)-2-norbornene, and norborneonorbornene.

7. The method of claim 1 wherein the composition further comprises a curative package comprising (a) a peroxide compound or (b) a sulfur donor curative and (c) at least one cure accelerator.

8. The method of claim 7 wherein the curative package comprises a sulfur donor curative and at least one cure accelerator.

9. The method of claim 8 wherein the sulfur donor curative is selected from the group consisting of sulfur, dimethyl-diphenylthiuram disulfide, dipentamethylenethiuram tetrasulfide, tetraethylthiuram disulfide, tetramethylthiuram disulfide, alkyl disulfides, selenium diethyldithiocarbamate, selenium dimethyldithiocarbamate, 4,4'-dithiodimorpholine, and N,N'-dithiobis(hexahydro-2H-azepinon-2).

10. The method claim 9 wherein the sulfur donor curative is sulfur.

11. The method of claim 10 wherein the sulfur is in the rhombic crystalline form called "rubber makers' sulfur" or "spider sulfur."

12. The method of claim 7 wherein the cure accelerator is selected from the group consisting of thiazoles, thiuram monosulfides, thiuram disulfides, and dithiocarbamates.

13. The method of claim 12 wherein the cure accelerator is selected from the group consisting of benzothiazyl disulfide; 2-mercaptobenzothiazole; tetramethylthiuram disulfide; tetramethylthiuram monosulfide; tetraethylthiuram disulfide; tetrabutylthiuram monosulfide; diisopropylthiuram disulfide; phenylethylthiuram disulfide; zinc dibutyldithiocarbamate; zinc pentamethylenedithiocarbamate; bismuth dimethyldithiocarbamate; nickel dibutyldithiocarbamate; copper dimethyldithiocarbamate; selenium diethyldithiocarbamate; lead dimethyldithiocarbamate; selenium dimethyldithiocarbamate; tellurium dimethyldithiocarbamate; tellurium diethyldithiocarbamate; cadmium diethyldithiocarbamate; zinc dibenzyldithiocarbamate; zinc dimethyldithio carbamate; and zinc diethyldithiocarbamate.

14. The method of claim 11 wherein the cure accelerator is selected from the group consisting of benzothiazyl disulfide; 2-mercaptobenzothiazole; tetramethylthiuram disulfide; tetramethylthiuram monosulfide; tetraethylthiuram disulfide; tetrabutylthiuram monosulfide; diisopropylthiuram disulfide; phenylethylthiuram disulfide; zinc dibutyldithiocarbamate; zinc pentamethylenedithiocarbamate; bismuth dimethyldithiocarbamate; nickel dibutyldithiocarbamate; copper dimethyldithiocarbamate; selenium diethyldithiocarbamate; lead dimethyldithiocarbamate; selenium dimethyldithiocarbamate; tellurium dimethyldithiocarbamate; tellurium diethyldithiocarbamate; cadmium diethyldithiocarbamate; zinc dibenzyldithiocarbamate; zinc dimethyldithio carbamate; and zinc diethyldithiocarbamate.

15. The method of claim 1 wherein the composition further comprises a filler selected from the group consisting of carbon black, silicates, talc, mica, clay, calcium carbonate, and mixtures thereof.

16. The method of claim 1 wherein the sheet material is flashing.

* * * * *